United States Patent
Onozato et al.

(10) Patent No.: US 12,272,146 B2
(45) Date of Patent: Apr. 8, 2025

(54) INFORMATION PROCESSING DEVICE

(71) Applicant: NEC Corporation, Tokyo (JP)

(72) Inventors: Muneaki Onozato, Tokyo (JP); Satoshi Terasawa, Tokyo (JP); Yuji Shinozaki, Tokyo (JP); Hiroo Ikeda, Tokyo (JP); Junko Nakagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/225,499

(22) Filed: Jul. 24, 2023

(65) Prior Publication Data

US 2023/0401868 A1    Dec. 14, 2023

Related U.S. Application Data

(63) Continuation of application No. 17/422,043, filed as application No. PCT/JP2019/001465 on Jan. 18, 2019, now Pat. No. 11,893,797.

(51) Int. Cl.
| | |
|---|---|
| *G06V 20/52* | (2022.01) |
| *G06T 7/292* | (2017.01) |
| *G06V 40/16* | (2022.01) |
| *G06V 40/20* | (2022.01) |

(52) U.S. Cl.
CPC ............. *G06V 20/53* (2022.01); *G06T 7/292* (2017.01); *G06V 40/172* (2022.01); *G06V 40/23* (2022.01); *G06T 2207/30196* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 2004/0004663 A1 | 1/2004 | Kahn | H04N 1/00127 348/207.1 |
| 2005/0078199 A1 | 4/2005 | Sudo | |
| 2005/0129324 A1 | 6/2005 | Lemke | G06V 10/26 382/284 |
| 2006/0279628 A1 | 12/2006 | Fleming et al. | |
| 2007/0201363 A1 | 8/2007 | Narukawa et al. | |
| 2007/0279494 A1 | 12/2007 | Aman et al. | |
| 2009/0087041 A1 | 4/2009 | Hasebe et al. | |
| 2013/0010118 A1 | 1/2013 | Miyoshi et al. | |
| 2013/0293721 A1 | 11/2013 | Takahashi | |

(Continued)

FOREIGN PATENT DOCUMENTS

| | | |
|---|---|---|
| CN | 105487798 A | 4/2016 |
| JP | H09-330415 A | 12/1997 |

(Continued)

OTHER PUBLICATIONS

JP Office Action for JP Application No. 2022-154461, mailed on Nov. 28, 2023 with English Translation.

(Continued)

*Primary Examiner* — Delomia L Gilliard

(57) ABSTRACT

An information processing device of the present invention includes a detection means that detects the content of an image, a determination means that determines a processing mode for the image based on the result of detection of the content of the image, and an execution means that executes processing for a captured image corresponding to the processing mode.

4 Claims, 12 Drawing Sheets

(56) References Cited

U.S. PATENT DOCUMENTS

| | | | |
|---|---|---|---|
| 2017/0148178 | A1 | 5/2017 | Oami et al. |
| 2018/0234635 | A1 | 8/2018 | Hayashi |
| 2019/0110112 | A1 | 4/2019 | Maloney |
| 2020/0169763 | A1 | 5/2020 | Burkhart et al. |
| 2020/0302715 | A1 | 9/2020 | Tulsidas |
| 2021/0344972 | A1 | 11/2021 | Burkhart et al. |
| 2022/0101632 | A1 | 3/2022 | Onozato et al. |

FOREIGN PATENT DOCUMENTS

| | | | | | |
|---|---|---|---|---|---|
| JP | 2004-208157 | A | | 7/2004 | |
| JP | 2005-012590 | A | | 1/2005 | |
| JP | 2005-026980 | A | | 1/2005 | |
| JP | 2007-264706 | A | | 10/2007 | |
| JP | 2007288444 | A | * | 11/2007 | |
| JP | 2008-017169 | A | | 1/2008 | |
| JP | 2010092353 | A | * | 4/2010 | |
| JP | 2012-191536 | A | | 10/2012 | |
| JP | 2012203305 | A | * | 10/2012 | |
| JP | 2013186872 | A | * | 9/2013 | |
| JP | 2014216685 | A | * | 11/2014 | |
| WO | WO-2012124230 | A1 | * | 9/2012 | ......... G08B 21/0476 |
| WO | 2014/155639 | A1 | | 10/2014 | |

OTHER PUBLICATIONS

International Search Report for PCT Application No. PCT/JP2019/001465, mailed on Apr. 9, 2019.

Taiwanese Office Action for TW Application No. 109100686 mailed on Jan. 20, 2022 with English Translation.

US Office Action for U.S. Appl. No. 18/235,759, mailed on Apr. 2, 2024.

US Office Action for U.S. Appl. No. 18/236,785, mailed on Sep. 10, 2024.

US Notice of Allowance for U.S. Appl. No. 18/236,005, mailed on Sep. 16, 2024.

JP Office Action for JP Application No. 2022-154461, mailed on May 7, 2024 with English Translation.

US Office Action for U.S. Appl. No. 18/235,758, mailed on Sep. 30, 2024.

Wheeler et al., "Face Recognition at a Distance System for Surveillance Applications", IEEE (Year: 2010), pp. 1-pp. 8.

* cited by examiner

Fig.3B

| No | DETERMINATION CRITERION | AREA | PROCESSING MODE — ANALYSIS PROCESSING | PROCESSING MODE — CONTROL PROCESSING |
|---|---|---|---|---|
| 1 | CAMERA 1, CAPTURED IMAGE: NUMBER/DENSITY > THRESHOLD | AREA 1 (CAMERA 1) | CROWD DETECTION PROCESSING | ZOOM DOWN |
| 2 | CAMERA 1, CAPTURED IMAGE: NUMBER/DENSITY ≦ THRESHOLD | AREA 1 (CAMERA 1) | FACE AUTHENTICATION PROCESSING | ZOOM UP |
| 3 | PROGRESS STATUS: BEFORE START OF GAME | AREA 1 (CAMERA 1) | FACE AUTHENTICATION PROCESSING | ZOOM UP |
| 4 | PROGRESS STATUS: DURING GAME | AREA 1 (CAMERA 1) | ACTION DETECTION PROCESSING | ZOOM DOWN |
| 5 | PROGRESS STATUS: AFTER END OF GAME | AREA 1 (CAMERA 1) | CROWD DETECTION PROCESSING | ZOOM DOWN |
| 6 | PROGRESS STATUS: NO EVENT | AREAS 1, 2 (CAMERAS 1, 2) | STOP | — |
| 7 | WEATHER: SUNNY | AREA 3 (CAMERA 3) | ACTION DETECTION PROCESSING | ZOOM DOWN |
|   |   | AREAS 2, 3 (CAMERAS 2, 3) | ACTION DETECTION PROCESSING | ZOOM DOWN |
| 8 | CAMERA 1, CAPTURED IMAGE: NUMBER/DENSITY ≦ THRESHOLD 2 | AREA 1 (CAMERA 1) | FACE AUTHENTICATION PROCESSING (PRIORITY) | MIDDLE |
|   |   |   | CROWD DETECTION PROCESSING | MIDDLE |

INFORMATION PROCESSING DEVICE

CROSS-REFERENCE TO RELATED APPLICATIONS

The present application is a continuation application of U.S. patent application Ser. No. 17/422,043 filed on Jul. 9, 2021, which is a National Stage Entry of international application PCT/JP2019/001465, filed Jan. 18, 2019, the disclosures of all of which are incorporated in their entirety by reference herein.

TECHNICAL FIELD

The present invention relates to an information processing device that controls processing for a captured image of a target place, an information processing method, and a program.

BACKGROUND ART

In places where a large number of unspecified persons gather such as an airport, a station, a store, and an event venue, a surveillance camera for detecting the action of a person and the person himself/herself is installed. From an image captured by the surveillance camera, processing is performed, for example, detection of the movement condition of a crowd including a large number of persons and detection of a previously registered person by face authentication.

As an example, Patent Document 1 describes detecting a target object from an input image captured by a camera and extracting a feature value. To be specific, Patent Document 1 describes assessing and selecting a detection method and an extraction method for an input image per time.

Patent Document 1: International Application Publication No. 2014/155639

However, in the technique of Patent Document 1 described above, only switching processing for an input image per time is performed. For this reason, it is impossible to perform processing for an input image efficiently and appropriately. As a result, there arises a problem that it is impossible to efficiently utilize an image capturing device installed for taking an input image.

SUMMARY OF THE INVENTION

Accordingly, an object of the present invention is to solve the abovementioned problem that it is impossible to efficiently utilize an image capturing device.

An information processing device according to an aspect of the present invention includes: a detection means that detects a content of a captured image; a determination means that determines a processing mode for the captured image based on a result of detection of the content of the captured image; and an execution means that executes processing for the captured image, the processing corresponding to the processing mode.

Further, a computer program according to another aspect of the present invention includes instructions for causing an information processing device to realize: a detection means that detects a content of a captured image; a determination means that determines a processing mode for the captured image based on a result of detection of the content of the captured image; and an execution means that executes processing for the captured image, the processing corresponding to the processing mode.

Further, an information processing method according to another aspect of the present invention includes: detecting a content of a captured image; determining a processing mode for the captured image based on a result of detection of the content of the captured image; and executing processing for the captured image, the processing corresponding to the processing mode.

With the configurations as described above, the present invention allows for efficient use of an image capturing device.

EXAMPLE EMBODIMENT

First Example Embodiment

Figure 7:
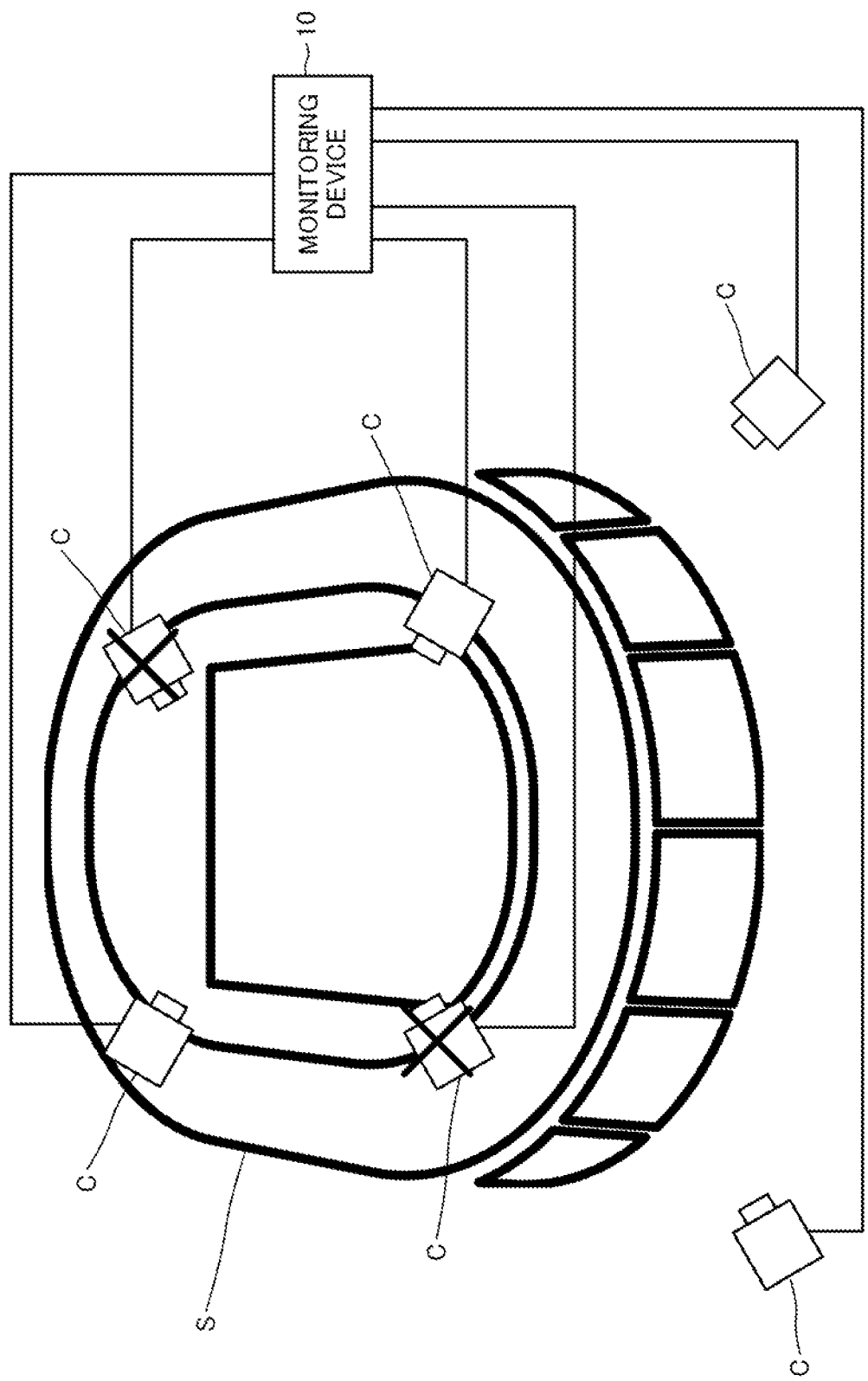
FIG. 7 is a view showing how control processing is performed by the monitoring device disclosed in FIG. 1.
Figure 8:
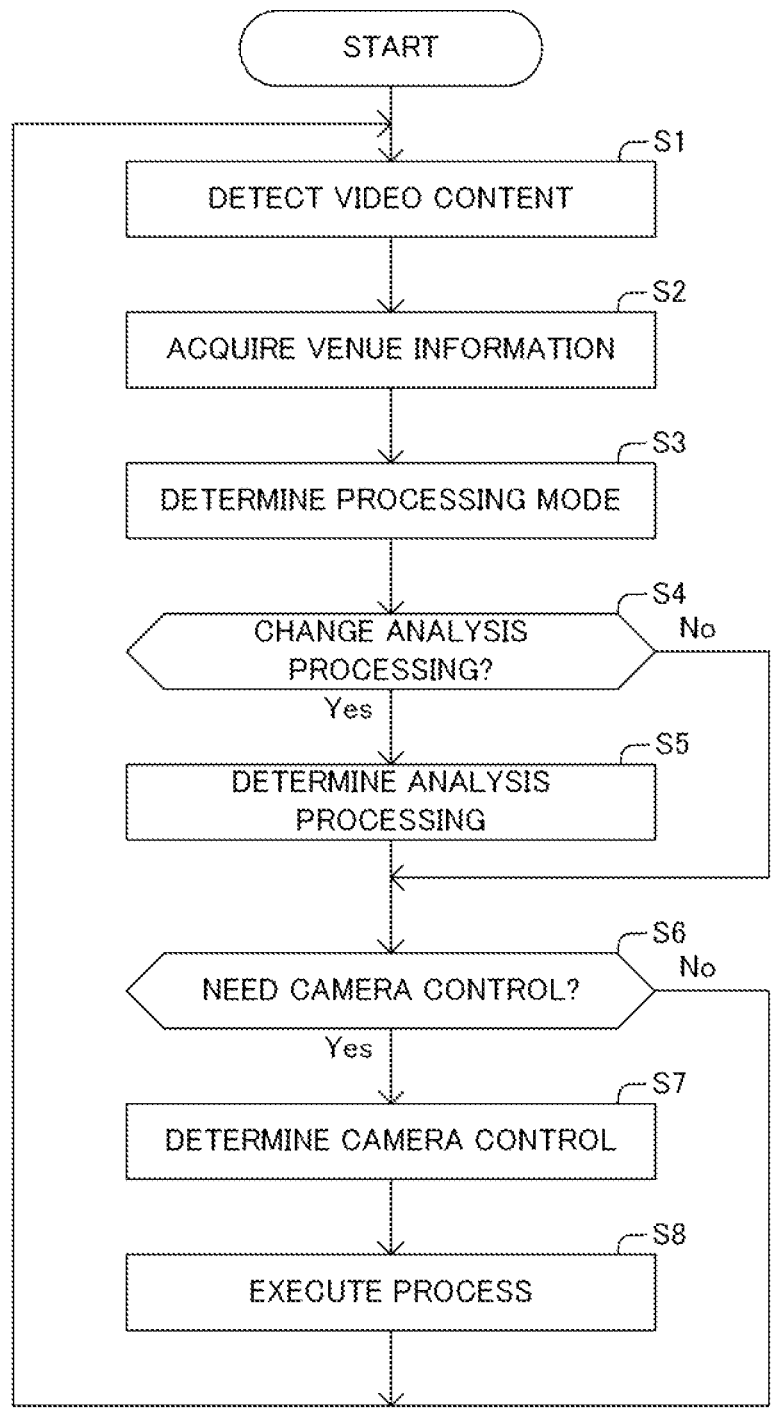
FIG. 8 is a flowchart showing a processing operation by the monitoring device disclosed in FIG. 1.
Figure 9:
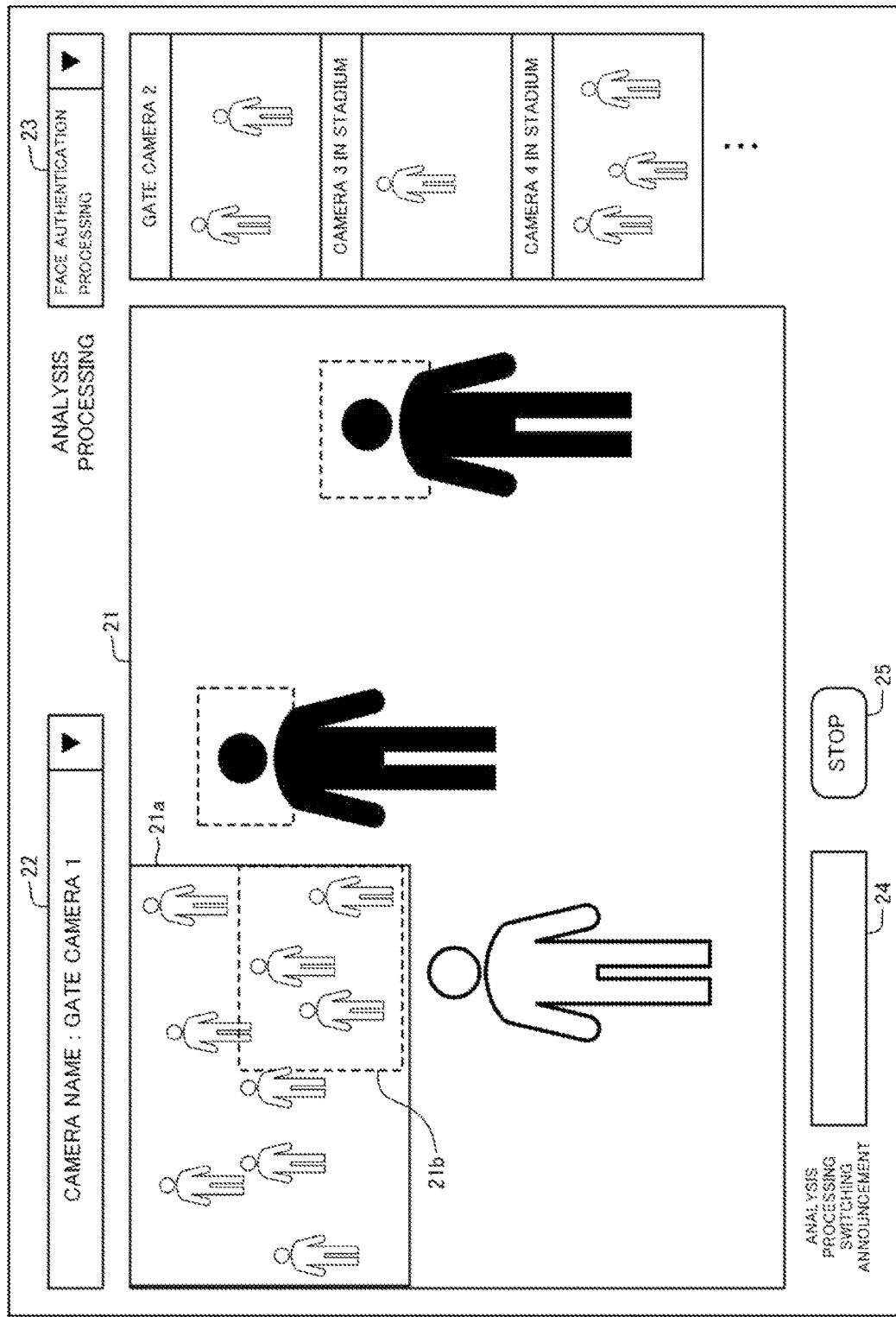
FIG. 9 is a view showing how monitoring a captured image is performed by the monitoring device disclosed in FIG. 1.
Figure 10:
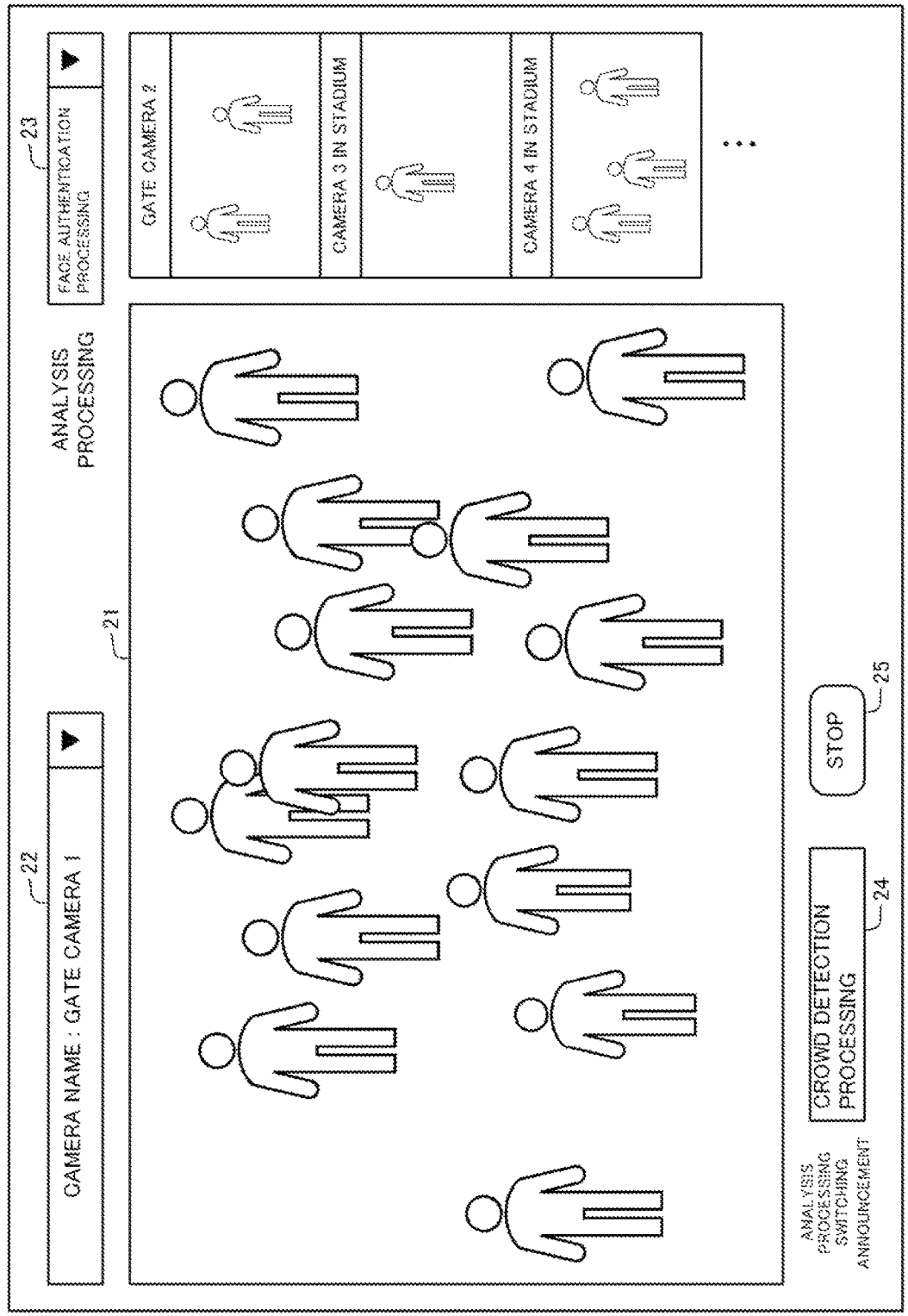
FIG. 10 is a view showing how monitoring a captured image is performed by the monitoring device disclosed in FIG. 1.
Figure 11:
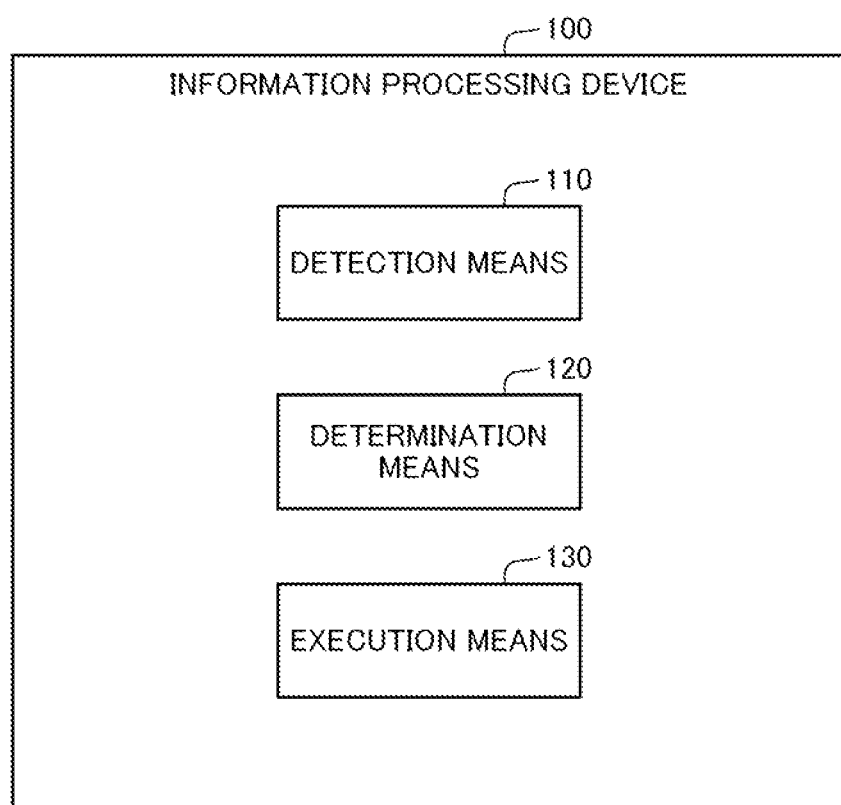
FIG. 11 is a block diagram showing the configuration of an information processing device in a second example embodiment of the present invention.

A first example embodiment of the present invention will be described with reference to FIGS. 1 to 10. FIGS. 1 to 7 are views for describing the configuration of an information processing system. FIGS. 8 to 10 are views for describing a processing operation of the information processing system.

[Configuration]

The information processing system according to the present invention is a system that controls a camera C serving as an image capturing device installed in a target place indoors or outdoors and controls processing for a captured image. In this example embodiment, an information processing system that includes a plurality of cameras C installed in a stadium S, which is a target place, where events such as a sport and a concert are held will be described as an example. However, the information processing system according to the present invention may be used in any place.

Figure 1:
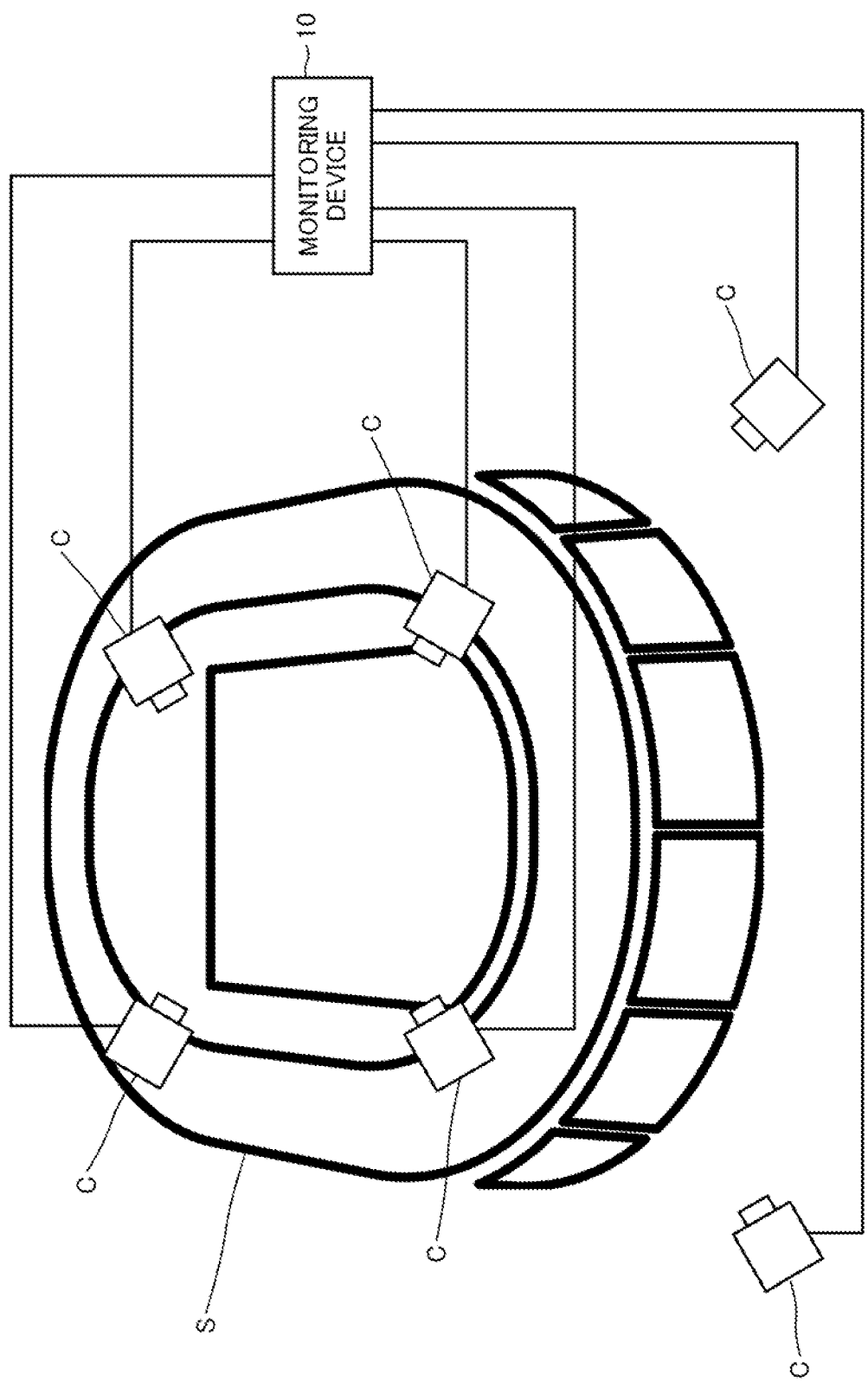
FIG. 1 is a view showing the entire configuration of an information processing system according to a first example embodiment of the present invention.
Figure 2:
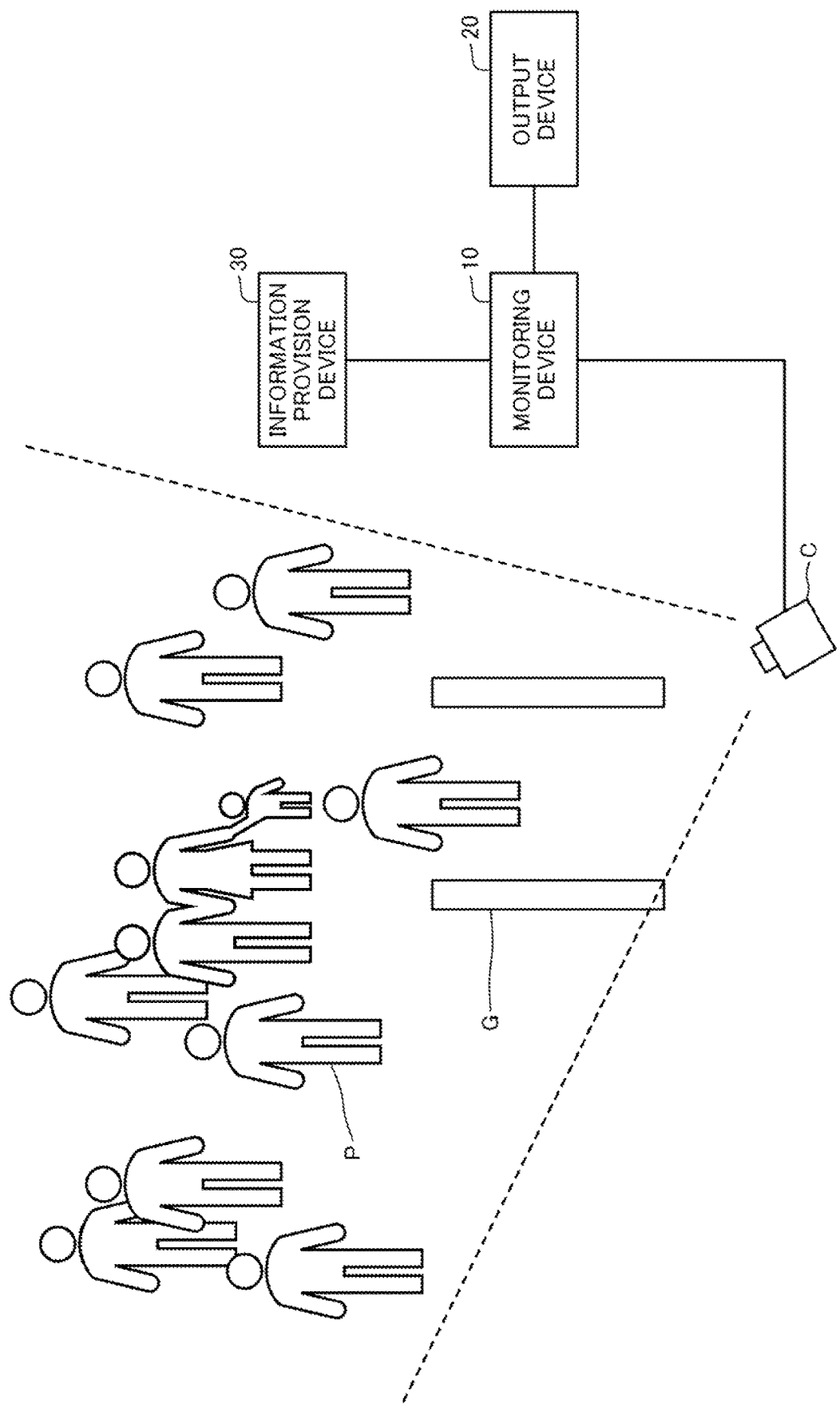
FIG. 2 is a view showing the entire configuration of the information processing system according to the first example embodiment of the present invention.
Figure 3:
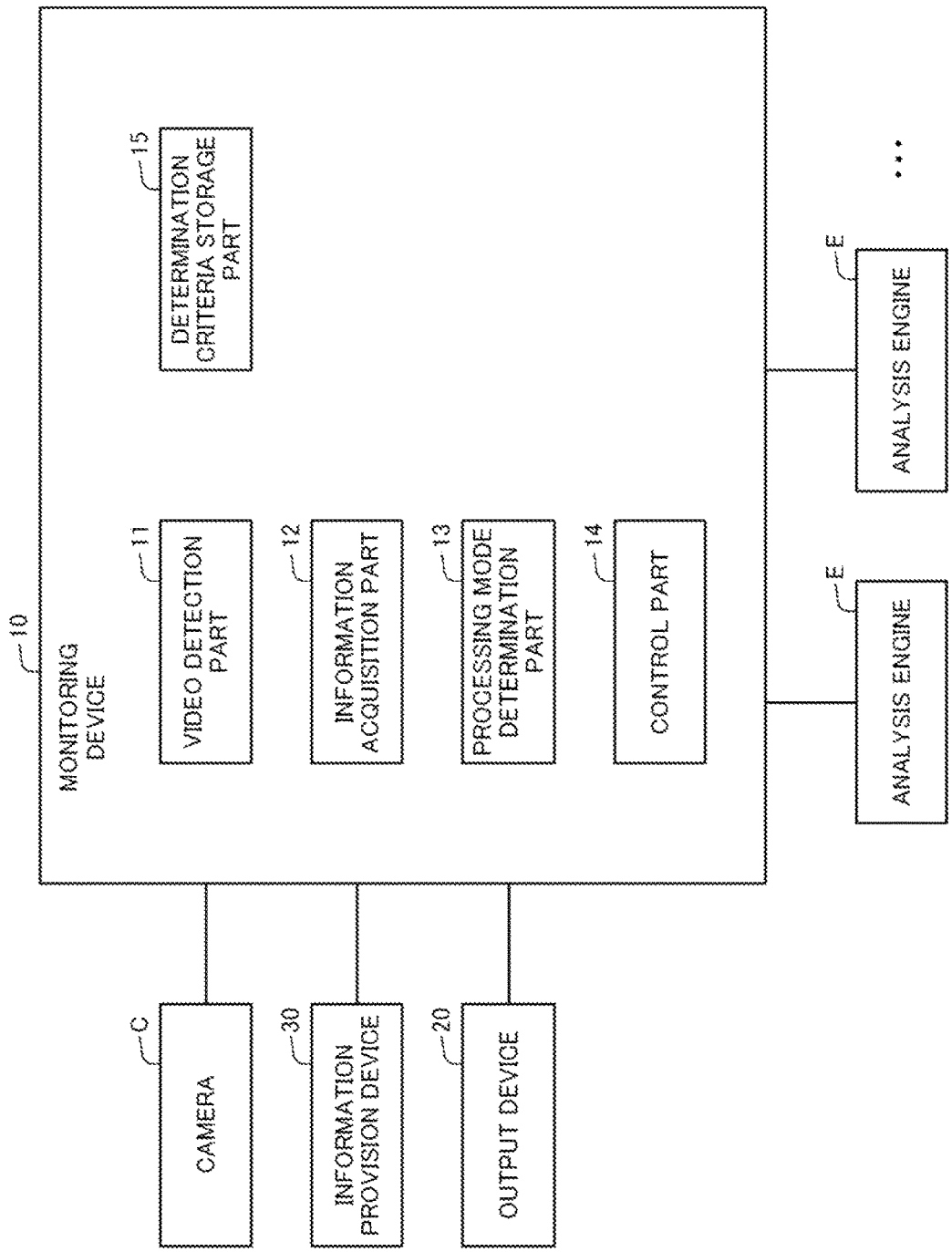
FIG. 3A is a block diagram showing the configuration of a monitoring device disclosed in FIG. 1.
FIG. 3B is a view showing an example of information stored in a determination criteria storage part of the monitoring device disclosed in FIG. 3A.

As shown in FIG. 1, the cameras C configuring the information processing system include an internal camera that captures images of the inside of the stadium S as a target place, namely, captures images of a place where an event is held such as the ground and a stand, and an external camera that captures images of the outside of the stadium S, namely, captures images of the vicinity of an entrance/exit gate and the surroundings of the stadium. FIG. 2 illustrates the camera C that captures images of the vicinity of an entrance/exit gate G. However, a place to install the camera C is not limited to the abovementioned place.

As shown in FIGS. 1 and 2, the information processing system in this example embodiment includes a monitoring device 10 connected to the cameras C, and an output device 20 and an information provision device 30 that are connected to the monitoring device 10. The monitoring device 10 executes analysis processing on a captured image captured by the camera C and control processing for the camera C. The output device 20 outputs a captured image and also outputs the result of processing executed by the monitoring device 10. The information provision device 30 provides various kinds of information such as the progress status of an event held in the stadium S and the weather information of the vicinity of the stadium S. Below, the respective components will be described in detail.

The monitoring device 10 is configured by one or a plurality of information processing devices each including an arithmetic logic unit and a storage unit. As shown in FIG. 3A, the monitoring device 10 includes a video detection part 11, an information acquisition part 12, a processing mode determination part 13, and a control part 14 that are constructed by the arithmetic logic unit executing a program. Moreover, the monitoring device 10 includes a determination criteria storage part 16 formed in the storage unit.

First, the video detection part 11 (detection means) receives captured images captured by the camera C at predetermined time intervals. For example, as shown in FIG. 2, the video detection part 11 receives a captured image captured by the camera C installed in the vicinity of the entrance/exit gate G from this camera C. Then, from the shape, color, motion and so on of an object shown in the captured image, the video detection part 11 detects the content of the captured image, specifically in this example embodiment, detects the condition of persons P in the captured image (step S1 in FIG. 8). For example, the video detection part 11 detects the number, density and movement direction of the persons P detected from the captured image. Then, the video detection part 11 notifies the detected condition of the persons P to the processing mode determination part 13.

The information acquisition part 12 acquires various kinds of information such as the progress status of an event being held in the stadium S and the weather information of the vicinity of the stadium S from the information provision device 30 connected to the monitoring device 10 via a network (step S2 in FIG. 8). To be specific, the information acquisition part 12 acquires information such as before the start of the game, during the game, and after the end of the game as the progress status of a game (match) being played in the stadium S, and weather information such as sunny, rainy, and temperature as the current weather information of the vicinity of the stadium S. Then, the information acquisition part 12 notifies the acquired information to the processing mode determination part 13.

Meanwhile, the video detection part 11 may detect the game progress status and the weather information mentioned above based on the content of the captured image captured with the camera C and notify the detected information to the processing mode determination part 13. For example, the video detection part 11 detects the number of the persons P on the ground, the presence/absence of a referee, motion, and so on based on the captured image captured with the camera C in the stadium S, and detects whether the progress status of the game is before the start of the game, during the game, or after the end of the game from the detected content. Besides, the video detection part 11 detects whether the person P as a spectator in the captured image is using an umbrella, noise of the image due to rain, and so on, and detects the weather information such as sunny or rainy from the detected content. The video detection part 11 may detect various kinds of information of the stadium S such as the above-described progress status and weather information from the video image by any method.

Based on the result of detection of the content of the captured image notified from the video detection part 11 and the information notified from the information acquisition part 12, the processing mode determination part 13 (determination means) determines a processing mode to be executed for the captured image (step S3 in FIG. 8). Determination criteria for determining a processing mode based on the result of detection of the content of the captured image and the information received from the information acquisition part 12 are stored in the determination criteria storage part 15 of the monitoring device 10. Therefore, the processing mode determination part 13 determines a processing mode using the determination criteria.

A processing mode to be executed for a captured image includes analysis processing for a captured image and control processing for the camera C for capturing an image. Furthermore, specifically, analysis processing for a captured image includes crowd detection processing, action detection processing, and face authentication processing on a person shown in a captured image. Control processing for the camera C includes control processing such as operation/stop, zoom, field angle switching and movement of the camera.

For example, as shown in FIG. 3B, the determination criteria described above are stored in association with processing modes. In the example of FIG. 3B, a determination criterion for a captured image or acquired information, an area (camera) that is the target of a processing mode to be determined, and a processing mode to be determined (analysis processing and control processing) are associated with each other.

Figure 4:
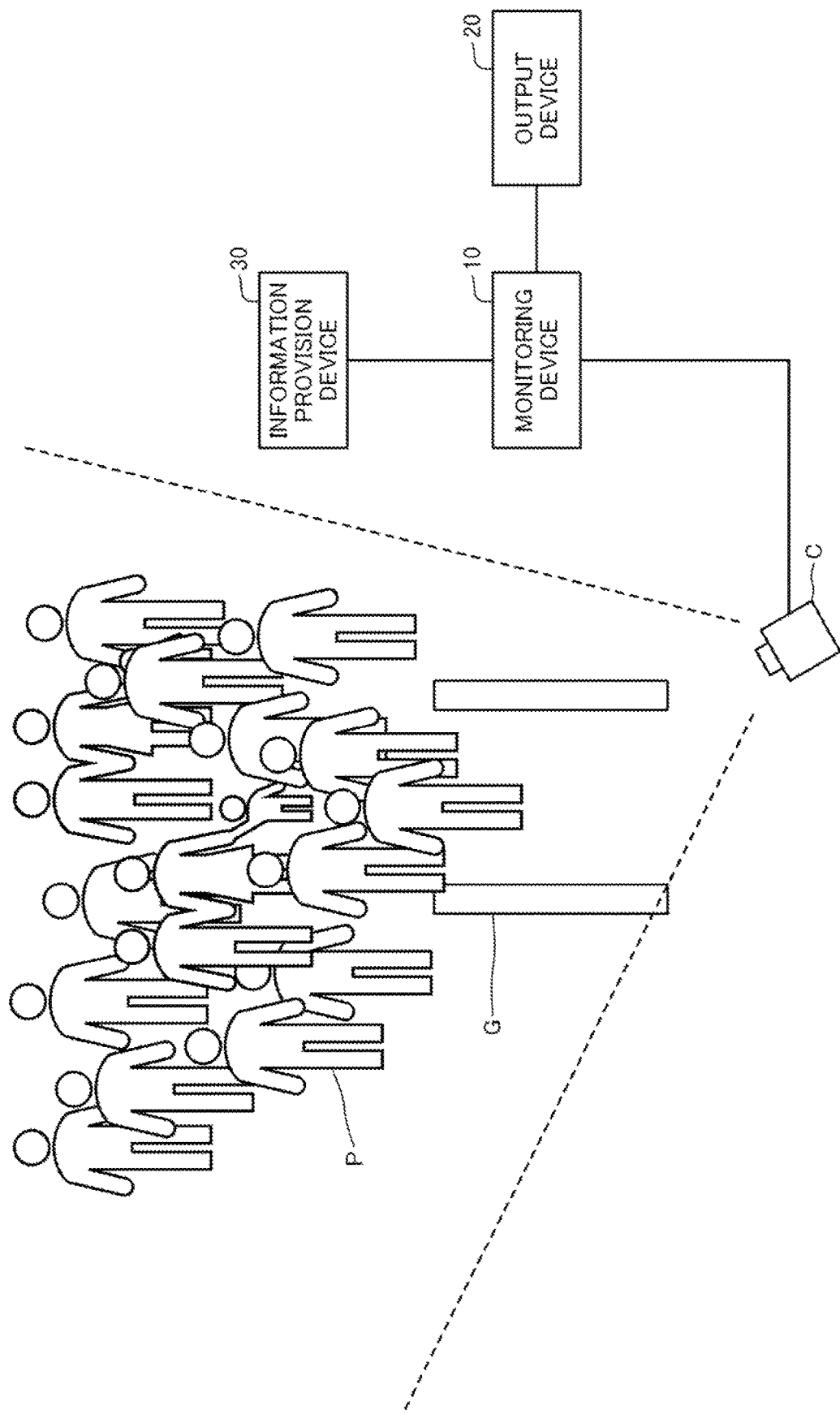
FIG. 4 is a view showing how control processing is performed by the monitoring device disclosed in FIG. 1.

A specific example of determination processing by the processing mode determination part 13 will be described. In this example, a case where a determination criterion No. 1 shown in FIG. 3B is applied will be described. When receiving information representing the number or density of the persons P shown in a captured image as the content of the captured image from the camera C installed in the vicinity of the entrance/exit gate G, the processing mode determination part 13 checks whether or not the number or density of the persons exceeds a threshold for determining as a crowd. When the number or density of the persons exceeds the threshold as shown in FIG. 4, the processing mode determination part 13 determines a processing mode for a captured image captured by the camera C in the vicinity of the entrance/exit gate G to be analysis processing of "crowd detection processing" (Yes at step S4, step S5 in FIG. 8). Crowd detection processing is processing for detecting whether a crowd is formed by the persons in a captured image captured by the camera C, the movement direction and moving speed of the crowd, and so on, and is executed by an analysis engine E connected to the monitoring device 10. Besides, when the number or density of the persons exceeds the threshold and the processing mode is determined to be analysis processing of the "crowd detection processing", the processing mode determination part 13 also determines to perform zoom control processing for the camera C in the vicinity of the entrance/exit gate G (Yes at step S6, step S7 in FIG. 8). That is to say, in this case, the processing mode determination part 13 determines to perform zoom-down control so as to be able to capture a whole image in order to facilitate the crowd detection processing for the captured image.

Figure 5:
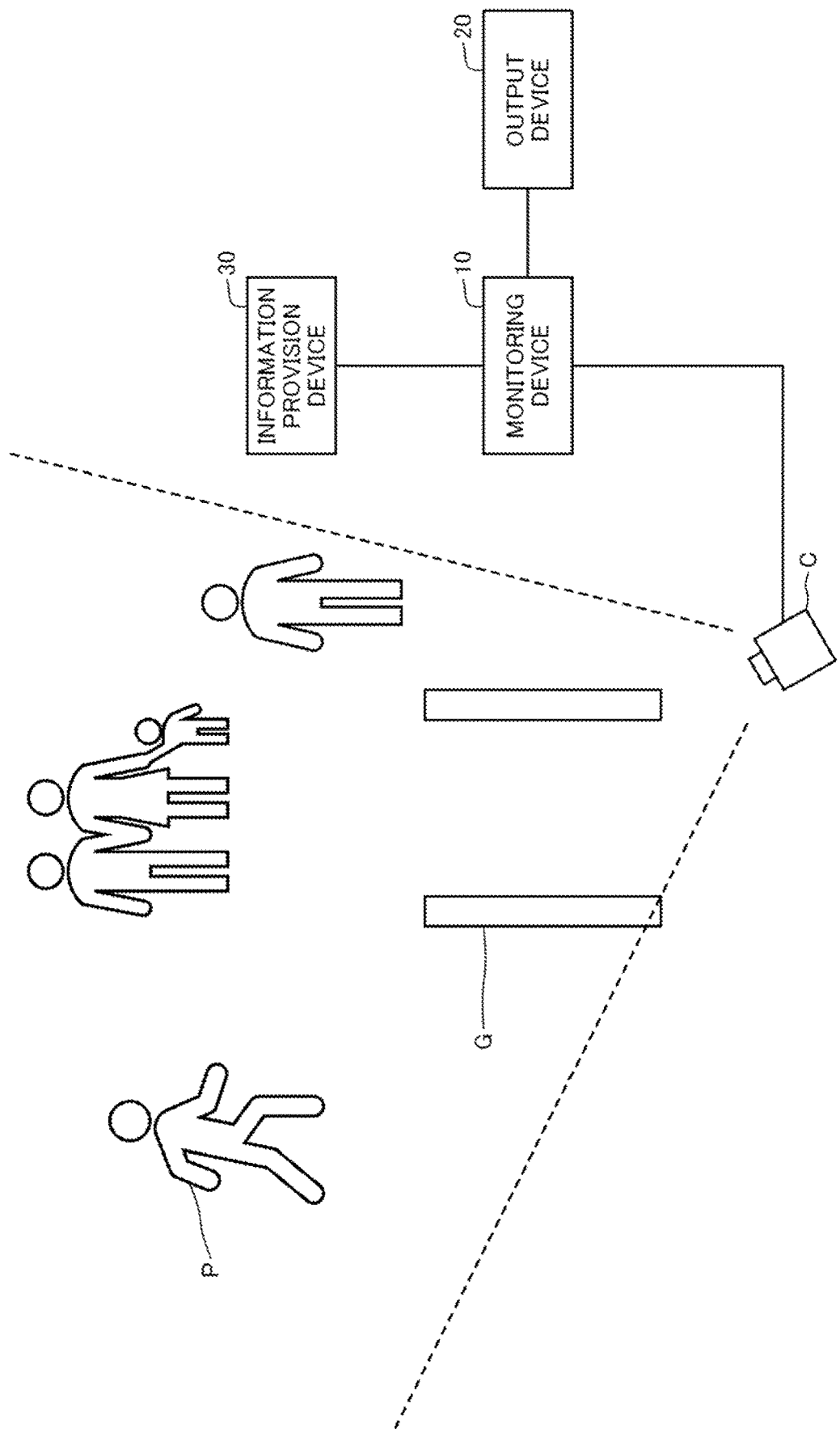
FIG. 5 is a view showing how control processing is performed by the monitoring device disclosed in FIG. 1.
Figure 6:
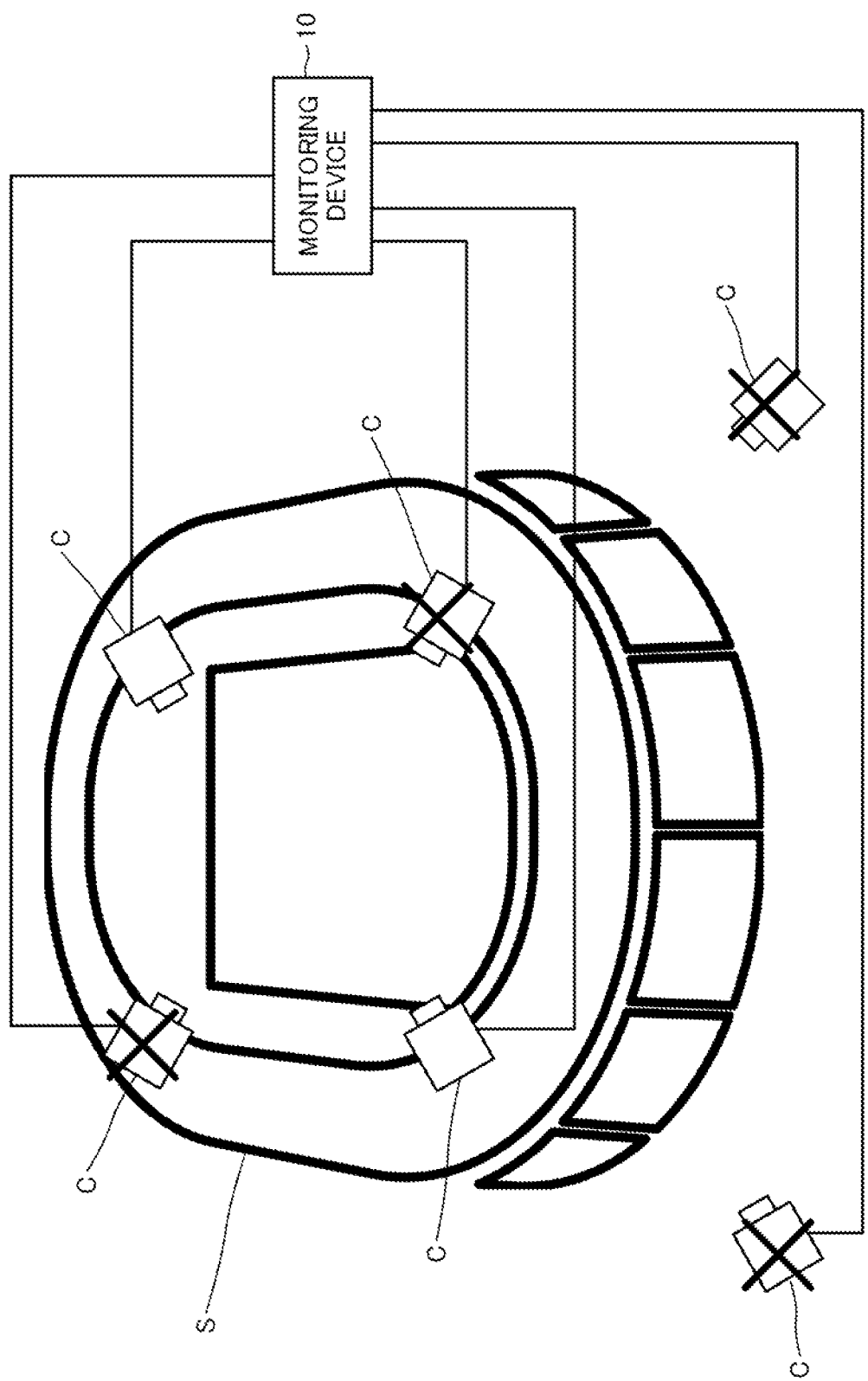
FIG. 6 is a view showing how control processing is performed by the monitoring device disclosed in FIG. 1.

Further, as an example, a case where a determination criterion No. 2 shown in FIG. 3B is applied will be described. When the number or density of the persons P shown in a captured image received from the camera C installed in the vicinity of the entrance/exit gate G is equal to or less than a threshold as shown in FIG. 5 in contrast with the abovementioned case, the processing mode determination part 13 determines a processing mode for the camera C to be analysis processing of "face authentication processing". Face authentication processing is authentication processing for extracting a feature value from a face image of a person in a captured image and checking whether the face image agrees with a previously registered face image, and is executed by the analysis engine E connected to the monitoring device 10. Moreover, when the number or density of the persons is equal to or less than the threshold and the processing mode is determined to be analysis processing of the face authentication processing, the processing mode determination part 13 also determines to perform zoom control processing for the camera C in the vicinity of the entrance/exit gate G. That is to say, in this case, the processing mode determination part 13 determines to perform zoom-up control so as to be able to capture a close image in order to facilitate acquisition of a face image of the person in the captured image.

Further, as an example, a case where a determination criterion No. 3, 4 or 5 shown in FIG. 3B is applied will be described. When receiving information representing the progress status of an event held in the stadium S from the information acquisition part 12, the processing mode determination part 13 checks the content of the progress status. Then, the processing mode determination part 13 determines a processing mode in accordance with the progress status of the event. For example, when the progress status is "before start of game", the processing mode determination part 13 determines a processing mode for a captured image captured by the camera C in the vicinity of the entrance/exit gate G to be "face authentication processing", and also determines a processing mode for the camera C to be "zoom-up control". When the progress status is "during game", the processing mode determination part 13 determines a processing mode for a captured image captured by the camera C in the vicinity of the entrance/exit gate G to be "action detection processing", and also determines a processing mode for the camera C to be "zoom-down control". When the progress status is "after end of game", the processing mode determination part 13 determines a processing mode for a captured image captured by the camera C in the vicinity of the entrance/exit gate G to be "crowd detection processing", and also determines a processing mode for the camera C to be "zoom-down control". The abovementioned "action detection processing" is analysis processing for detecting a person who is taking a specific action such as a suspicious action or a stagger from the flow lines or motions of the persons P in the captured image, and is executed by the analysis engine E connected to the monitoring device 10.

Further, as an example, a case where the processing mode determination part 13 determines a processing mode based on both the content of a captured image and information of a target place will be described. In this case, "progress status: before start of game" and "image captured by camera 1: number/density of persons≤threshold" are set as determination criteria, and "face authentication processing" and "zoom-up" are set as processing modes corresponding to the above. When the progress status is before the start of a game and the number or density of the persons P in a captured image captured by the camera C in the vicinity of the entrance/exit gate G is equal to or less than a threshold, the processing mode determination part 13 determines a processing for the captured image captured by the camera C to be analysis processing of the "face authentication processing", and determines a processing mode for the camera C to be "zoom-up control". Moreover, as another example, when the progress status is before the start of a game and the number or density of the persons P in the captured image captured by the camera C in the vicinity of the entrance/exit gate G exceeds the threshold, the processing mode determination part 13 determines a processing mode for the captured image captured by the camera C to be analysis processing of the "crowd detection processing" and determines a processing mode for the camera C to be "zoom-down control".

Further, as an example, a case where a determination criterion No. 6 shown in FIG. 3B is applied will be described. The processing mode determination part 13 checks from the progress status of an event of the stadium S whether the event is being held in the stadium S. For example, the processing mode determination part 13 collects information on the progress status of the event such as a timetable, a period of time elapsed after the start of the event, and the actions (left or seated) of the spectators analyzed from the captured image, and checks whether the event has not been held or has ended or in another progress status (being held, on break, etc.). In the case of detecting that the event is not being held, the processing mode determination part 13 determines a processing mode of controlling operation/stop of the camera C or the analysis engine. For example, as indicated by a cross mark in FIG. 6, the processing mode determination part 13 determines a processing mode for the camera C in the vicinity of the entrance/exit gate G to be "stop", and stops capturing an image. Moreover, as indicated by the cross mark in FIG. 6, the processing mode determination part 13 determines a processing mode for part of the cameras C capturing an image of the inside of the stadium S to be "stop" and determines a processing mode for the remaining cameras C to be "action detection processing", and also determines a processing mode for these cameras C to be "zoom-down control". With this, it is possible to detect an illegal intruder in the stadium S while restricting the number of the operating cameras.

Further, as an example, a case where a determination criterion No. 7 shown in FIG. 3B is applied will be described. When receiving weather information around the stadium S from the information acquisition part 12, the processing mode determination part 13 checks the content of the weather. Then, the processing mode determination part 13 determines a processing mode in accordance with a weather condition. For example, when the weather around the stadium S is "sunny", the processing mode determination part 13 determines a processing mode for a captured image captured by the camera C in the stadium S to be "action detection processing", and also determines a processing mode for the camera C to be "zoom-down control". On the other hand, as an example where another determination criterion is applied, when the weather around the stadium S is "rainy", the processing mode determination part 13 determines a processing mode for only part of the cameras C capturing an image of the inside of the stadium S to be "stop" as shown in FIG. 7, and stops analysis processing for the captured image. This is because it is anticipated that more spectators put up umbrellas due to rain and hence the processing accuracy of the action detection processing will get lower, so that the processing mode determination part 13 stops capturing an image and the analysis processing. As an example in which still another criterion is applied, when the temperature around the stadium S is high and is equal to or more than a threshold, the processing mode determination part 13 determines a processing mode for a captured image captured by the camera C in the stadium S to be "action detection processing", and also determines a processing mode for the camera C to be "zoom-up control". With this, it is possible to detect a spectator in the stadium S in a bad physical condition, for example, a spectator who is staggering.

As described above, when the video detection part 11 detects the progress status of an event or weather information around the stadium S from the content of a captured image, the processing mode determination part 13 may determine a processing mode based on the progress status of the event and the weather information notified from the video detection part 11.

In the above description, the processing mode determination part 13 determines to execute one kind of analysis processing on a captured image of one area (camera). However, the processing mode determination part 13 may determine to execute multiple kinds of analysis processing on a captured image of one area (camera). That is to say, as indicated by a determination criterion No. 8 of FIG. 3B, regarding a determination criterion "number/density of persons≤threshold 2", multiple kinds of analysis processing "face authentication processing" and "crowd detection processing" may be associated with an area 1 (camera 1). In this case, both the kinds of analysis processing "face authentication processing" and "crowd detection processing" are executed on a captured image of the area 1 (camera 1). In a case where one analysis processing "face authentication process" is set to be "prior" as indicated by the determination criterion No. 8 of FIG. 3B, the processing mode determination part 13 determines to execute "face authentication processing" in prior to "crowd detection processing". In this case, "face authentication processing" is executed by the analysis engine E earlier in order than "crowd detection processing", or more resources such as CPU of the analysis engine E are assigned to "face authentication processing" than "crowd detection processing". In a case where the resources are a little, only "face authentication processing" is executed. Besides, for "face authentication processing", the number of frames of a captured image to be used is more than for "crowd detection processing", or processing is executed in higher image quality than for "crowd detection processing". Thus, the processing mode determination part 13 may determine the processing level of a processing mode.

Further, in the above description, the processing mode determination part 13 determines a processing mode for each area (camera). However, the processing mode determination part 13 may determine a processing mode for each of the division regions obtained by dividing an area, namely, an image captured by the camera C into a plurality of regions. For example, the processing mode determination part 13 may determine a processing mode for a left half region of a captured image to be "face authentication processing" because the left half region satisfies the determination criterion "number/density≤threshold", and may determine a processing mode for a right half region of the captured image to be "crowd authentication processing" because the right half region satisfies the determination criterion "number/density>threshold". Meanwhile, the processing mode determination part 13 may determine a processing mode for the left half region of the captured image to be "face authentication processing" and determine no processing mode for the right half region of the captured image. In this case, the processing mode determination part 13 may determine a processing mode for the camera C to be "zoom-up control" so as to correspond to "face authentication processing" for the left half region. Besides, in a case where a person shown in the left half region of the captured image for which a processing mode has been determined to be "face authentication processing" has moved, the processing mode determination part 13 may change and set a region for which a processing mode has been determined to be "face authentication processing" in accordance with the movement of the person. Thus, for each region of a captured image, the processing mode determination part 13 may check whether or not the region satisfies the determination criterion and determine a process mode.

In the above description, a case where the processing mode determination part 13 detects, as the content of a captured image, the "number or density" of persons shown in the captured image and determines a processing mode has been described. However, the processing mode determination part 13 may detect the content of a captured image as shown below and determine a processing mode. For example, the processing mode determination part 13 may detect the movement direction of a person shown in a captured image, and determine a processing mode to be the face authentication processing when the person is moving toward the camera and determine a processing mode to be whole-body authentication processing when the person is moving away. Whole-body authentication processing is person authentication processing with a whole-body image including the cloths, hair style, silhouette, belongings and so on of a person. Moreover, for example, the processing mode determination part 13 may detect a face region of a person shown in a captured image, and determine a processing mode to be the face authentication processing when a face size exceeds a predetermined value and determine a processing mode to be the whole-body authentication processing when the face size is equal to or less than the predetermined value. Moreover, for example, the processing mode determination part 13 may detect the action of a person shown in a captured image and, when detecting a specific action (e.g., the person is swinging something, is wrestling with someone, or falls), determine a processing mode to be control processing of zooming up the camera. However, the content of a captured image used when the processing mode determination part 13 determines a processing mode is not limited to the abovementioned ones.

In the examples using the information of FIG. 3B described above, the processing mode determination part 13 determines a processing mode depending on whether or not one kind of information among the content of a captured image, the progress status of an event and weather information satisfies its determination criterion. However, in a case where multiple kinds of information satisfy their determination criteria, the processing mode determination part 13 may determine a processing mode associated with these determination criteria. That is to say, in a case where one kind of information among the content of a captured image, the progress status of an event and weather information satisfies its determination criterion or two or three kinds of information among the above satisfy their determination criteria, the processing mode determination part 13 may determine a processing mode associated with the determination criterion/criteria. To be specific, in a case where the content of a captured image and the progress status of an event, or the content of a captured image and weather information, or the progress status of an event and weather information, or the content of a captured image, the progress status of an event and weather information satisfy their determination criteria, the processing mode determination part 13 may determine a processing mode associated with these determination criteria. Furthermore, at this time, the processing mode determination part 13 may determine a processing mode depending on whether or not multiple pieces of information in one kind satisfy the determination criteria. For example, in a case where, of the content of a captured image, the number/density of persons and the movement direction of a person satisfy the determination criteria, the processing mode determination part 13 may determine a processing mode associated with the determination criteria. Besides, in the examples of FIG. 3B, a case of determining a processing mode to be only "analysis processing" and a case of determining both "analysis processing" and "camera control processing" have been described. However, the processing mode determination part 13 may determine only "camera control processing".

The control part 14 (notification means, execution means) first outputs the processing mode determined as described above through the output device 20, thereby notifying to the outside. Moreover, the control part 14 executes processing for to the captured image corresponding to the determined processing mode (step S8 in FIG. 8). That is to say, in accordance with the determined processing mode, the control part 14 executes operation/stop control and zoom control for the camera C, and controls the respective analysis engines E to execute various kinds of analysis processing on the captured image. Furthermore, the control part 14 outputs the processing result of the executed analysis processing through the output device 20. With this, a guard of the stadium S can recognize a processing mode to be executed and also recognize the result of processing.

An example of when the abovementioned control part 14 outputs through the output device 20 how analysis processing is executed on a captured image is described in FIGS. 9 and 10. First, as shown in FIG. 9, the output device 20 displays an image display region 21 for displaying a captured image, a camera name display region 22 for displaying the name of a camera capturing the captured image displayed in the screen display region 21, an analysis processing name display region 23 for displaying the name of analysis processing executed on the captured image, an announced analysis processing name display region 24 for displaying the name of analysis processing to which processing is switched, and a stop button 25.

The example of FIG. 9 shows how the "face authentication processing" is executed on a captured image captured by the camera C of a "gate camera 1". At this time, the whole captured image may be output in the whole region of the image display region 21. However, in this example, a reduced whole captured image 21a is displayed in the upper left corner, and a part 21b of the captured image 21a is enlarged and displayed in the whole image display region 21. The enlarged image 22b is display showing the processing result of the face authentication processing executed on the captured image 21a, specifically, an enlarged image of a region where a person who answers a previously registered person is found by face authentication. At this time, in the enlarged image 21b, the face portion of the person who answers the registered person as a result of the face authentication processing is displayed in an emphasized manner. For example, the person who answers the registered person is blacked and the face portion of this person is boxed. Meanwhile, in a case where the face authentication processing is executed and a person who answers a registered person is not found, the whole captured image is displayed in the image display region 21 as shown in FIG. 10.

While the face authentication processing is executed on a captured image as described above, the processing mode determination part 13 performs determination of a new processing mode. That is to say, in a case where the content of a captured image, the progress status of an event, or weather information satisfies another determination criterion, the processing mode determination part 13 determines another processing mode associated with the other determination criterion. Then, the control part 14 displays/outputs the newly determined other processing mode in the announced analysis processing name display region 24, and switches the processing mode to a new processing mode after a certain time. For example, in the example of FIG. 10, the number of persons in a captured image has increased and the number/density of the persons has exceeded a threshold, so that the processing mode determination part 13 determines the analysis processing of the processing mode to be the "crowd detection processing" and displays it in the announced analysis name display region 24. At this time, in the case of desiring to switch to the "crowd detection processing", an operator operating the output device 20 pushes the stop button 25. With this, the control part 14 does not switch analysis processing for the captured image to the "crowd detection processing" and keeps executing the "face authentication processing". Meanwhile, after "crowd detection processing" is displayed in the announced analysis process name display region 24 and a certain time passes without the stop button 25 being pressed, the control part 14 switches the analysis processing for the captured image to the "crowd detection processing".

In a case where the operator wants to set a desired processing mode (analysis processing) for a captured image, the operator can select the desired analysis processing from a pulldown menu of the analysis processing name display region 23. Then, the control part 14 switches the analysis processing to the selected analysis processing. Thus, for example, when the control part 14 switches analysis processing, it is possible to execute desired analysis processing, for example, it is possible to return the analysis processing to the one before switching and execute it.

Further, when the operator pushes the stop button 25 or selects desired analysis processing from the pulldown menu of the analysis process name display region 23 as described above, the control part 14 acquires information including the content of a captured image, the progress status of an event, and weather condition. Then, the control part 14 learns so as to associate the acquired information with the analysis processing of the processing mode before switching and the selected analysis processing. That is to say, the control part 14 may consider the acquired information including the content of the captured image, the progress status of the event and the weather condition to be determination criteria, and associate the determination criteria with the analysis processing before switching and the selected analysis processing, thereby generating new determination criteria information.

In the example shown in FIGS. 9 and 10, a captured image captured by the single camera C and the result of analysis processing executed on the captured image are largely displayed in the image display region 21. However, a plurality of captured images captured by a plurality of cameras C and the results of the analysis processing may be displayed in the image display region 21.

Thus, the information processing system according to the present invention can control the status of capturing an image by the camera C installed in a target place such as the stadium S and analysis processing executed on a captured image, depending on the condition of the target place. With this, the guard can recognize a processing mode executed depending on the condition and a processing result, and promptly take measures in accordance with the processing result. As a result, it is possible to efficiently use the camera C installed in the target place.

In the above description, the condition of persons shown in a captured image is detected as the content of a captured image, and a processing mode for the captured image is determined based on the condition of the persons. However, a processing mode may be determined based on the result of detection of any content in a captured image. For example, when an action such as leaving an object by a person is detected or an animal is detected in a captured image, a processing mode may be determined so as to execute control processing such as zoom-up of the camera C and analysis processing such as object detection processing. Moreover, in the above description, a processing mode for a captured image is determined based on weather information or the progress status of an event of a target place. However, a processing mode may be determined based on any information of a target place. Furthermore, in the above description, the content of analysis processing executed on a captured image or the content of control processing executed on an image capturing device are determined as a processing mode to be determined. However, another processing mode may be determined as long as it is processing for a captured image.

Second Example Embodiment

Next, a second example embodiment of the present invention will be described with reference to FIG. 9. FIG. 9 is a block diagram showing the configuration of an information processing device in the second example embodiment. In this example embodiment, the overview of the configuration of the monitoring device described in the first example embodiment.

As shown in FIG. 9, an information processing device 100 in this example embodiment includes: a detection means 120 that detects content of a captured image; a determination means that, based on a result of detection of content of a captured image, determines a processing mode for the captured image; and an execution means 130 that executes processing for a captured image corresponding to a processing mode.

The detection means 110, the determination means 120, and the execution means 130 that are described above may be constructed by an arithmetic logic unit of the information processing device 100 executing a program, or may be constructed by an electronic circuit.

Then, the information processing device 100 with the above configuration operates so as to execute processing for: detecting content of a captured image; based on a result of detection of content of a captured image, determining a processing mode for image; and executing processing for a captured image corresponding to a processing mode.

According to the present invention, in accordance with the content of an image captured by an image capture device installed in a target place, executes a process relating to a captured image corresponding to the processing mode. With this, it is possible to execute a process relating to a captured image in accordance with the condition of a target place, and it is possible to efficiently use an image capture device installed in a target place.

<Supplementary Notes>

The whole or part of the example embodiments disclosed above can be described as in the following supplementary notes. Below, the overview of the configurations of the information processing device, the information processing method and the program according to the present invention will be described. However, the present invention is not limited to the following configurations.

(Supplementary Note 1)

An information processing device comprising:
a detection means that detects a content of a captured image;
a determination means that determines a processing mode for the captured image based on a result of detection of the content of the captured image; and
an execution means that executes processing for the captured image, the processing corresponding to the processing mode.

(Supplementary Note 2)

The information processing device according to Supplementary Note 1, wherein:
the detection means detects a status of a person in the captured image; and
the determination means determines the processing mode based on the condition of the person in the captured image.

(Supplementary Note 3)

The information processing device according to Supplementary Note 1 or 2, wherein:
the determination means determines an analysis processing mode representing a content of analysis processing on the captured image as the processing mode, based on the result of detection of the content of the captured image; and
the execution means executes analysis processing on the captured image, the analysis processing corresponding to the analysis processing mode.

(Supplementary Note 4)

The information processing device according to Supplementary Note 3, wherein:
the detection means detects a number or density of persons in the captured image; and
the determination means determines the analysis processing mode based on a result of detection of the number or density of the persons in the captured image.

(Supplementary Note 5)

The information processing device according to Supplementary Note 3 or 4, wherein:
the detection means detects an action of the person in the captured image; and
the determination means determines the analysis processing mode based on a result of detection of the action of the person in the captured image.

(Supplementary Note 6)

The information processing device according to any of Supplementary Notes 1 to 5, wherein the determination means determines an analysis processing mode representing a content of analysis processing on the captured image as the processing mode, based on the result of detection of the content of the captured image, and also determines control processing on an image capturing device for capturing the captured image, the control processing corresponding to the analysis processing mode.

(Supplementary Note 7)

The information processing device according to any of Supplementary Notes 1 to 6, wherein the determination means determines, as the processing mode, any of crowd detection processing, action detection processing and face authentication processing on the person in the captured image.

(Supplementary Note 8)

The information processing device according to any of Supplementary Notes 1 to 7, wherein the determination means determines control processing on an image capturing device for capturing the captured image, as the processing mode.

(Supplementary Note 9)

The information processing device according to any of Supplementary Notes 1 to 8, wherein the determination means determines the processing mode based on the result of detection of the content of the captured image and information output in association with a place where the captured image has been captured.

(Supplementary Note 10)

The information processing device according to Supplementary Note 9, wherein the determination means determines the processing mode based on information representing a progress status of an event being held in a place where the captured image is being captured.

(Supplementary Note 11)

The information processing device according to Supplementary Note 9 or 10, wherein the determination means determines the processing mode based on weather information of a place where the captured image is being captured.

(Supplementary Note 12)

The information processing device according to any of Supplementary Notes 1 to 11, further comprising a notification means that notifies the processing mode to outside.

(Supplementary Note 13)

A computer program comprising instructions for causing an information processing device to realize:
 a detection means that detects a content of a captured image;
 a determination means that determines a processing mode for the captured image based on a result of detection of the content of the captured image; and
 an execution means that executes processing for the captured image, the processing corresponding to the processing mode.

(Supplementary Note 14)

An information processing method comprising:
 detecting a content of a captured image;
 determining a processing mode for the captured image based on a result of detection of the content of the captured image; and
 executing processing for the captured image, the processing corresponding to the processing mode.

(Supplementary Note 15)

The information processing method according to Supplementary Note 14, wherein:
 a status of a person in the captured image is detected as the content of the captured image; and
 the processing mode is determined based on the condition of the person in the captured image.

(Supplementary Note 16)

The information processing method according to Supplementary Note 14 or 15, wherein:
 an analysis processing mode representing a content of analysis processing on the captured image is determined as the processing mode, based on the result of detection of the content of the captured image; and
 analysis processing corresponding to the analysis processing mode is executed on the captured image.

(Supplementary Note 17)

The information processing method according to any of Supplementary Notes 14 to 16, wherein control processing on an image capturing device for capturing the captured image is determined as the processing mode.

(Supplementary Note 18)

The information processing method according to any of Supplementary Notes 14 to 17, wherein the processing mode is determined based on the result of detection of the content of the captured image and information output in association with a place where the captured image has been captured.

The above program is stored using various types of non-transitory computer-readable mediums, and can be supplied to the computer. The non-transitory computer-readable medium includes various types of tangible recording mediums. Examples of the non-transitory computer-readable medium include a magnetic recording medium (for example, a flexible disk, a magnetic tape, a hard disk drive, etc.), a magneto-optical recording medium (a magneto-optical disk, etc.), a CD-ROM (Read Only Memory), a CD-R, a CD-R/W, and a semiconductor memory (a mask ROM, a PROM (Programmable ROM), an EPROM (Erasable PROM), a flash ROM, and a RAM (Random Access Memory)). The program may be supplied to the computer by various types of transitory computer-readable mediums. Examples of the transitory computer-readable medium include an electric signal, an optical signal, and an electromagnetic wave. The transitory computer-readable medium can supply the program to the computer via a wired communication path such as an electric wire and an optical fiber, or via a wireless communication path.

Although the present invention has been described above with reference to the example embodiments and so on, the present invention is not limited to the above example embodiments. The configurations and details of the present invention can be changed in various manners that can be understood by one skilled in the art within the scope of the present invention.

DESCRIPTION OF REFERENCE NUMERALS 10 monitoring device
11 video detection part
12 information acquisition part
13 processing mode determination part
14 control part
15 determination criteria storage part
20 output device
30 information provision device
100 information processing device
110 detection means 120 determination means
130 execution means
C camera
E analysis engine
G entrance/exit gate
P person
S stadium

The invention claimed is:

1. An information processing method performed by a computer and comprising:
   acquiring a captured image; and
   determining a processing mode based on temperature of a place where the captured image is being captured,
   on a basis of the temperature, the processing mode is determined to be action detection processing on a person in the captured image.

2. An information processing method performed by a computer and comprising:
   acquiring a captured image; and
   determining a processing mode based on temperature of a place where the captured image is being captured,
   on a basis of the temperature, the processing mode is determined to be zoom control processing of an image capturing device that is capturing the image.

3. An information processing method performed by a computer and comprising:
   acquiring a captured image; and
   determining a processing mode based on temperature of a place where the captured image is being captured,
   in a case where the temperature is equal to or more than a threshold, the processing mode is determined to be action detection processing on a person in the captured image, and zoom control processing of an image capturing device that is capturing the image.

4. The information processing method according to claim 3, wherein
   processing corresponding to the determined processing mode is performed, and a stagger of the person in the captured image is detected.

* * * * *